Patented Nov. 14, 1933

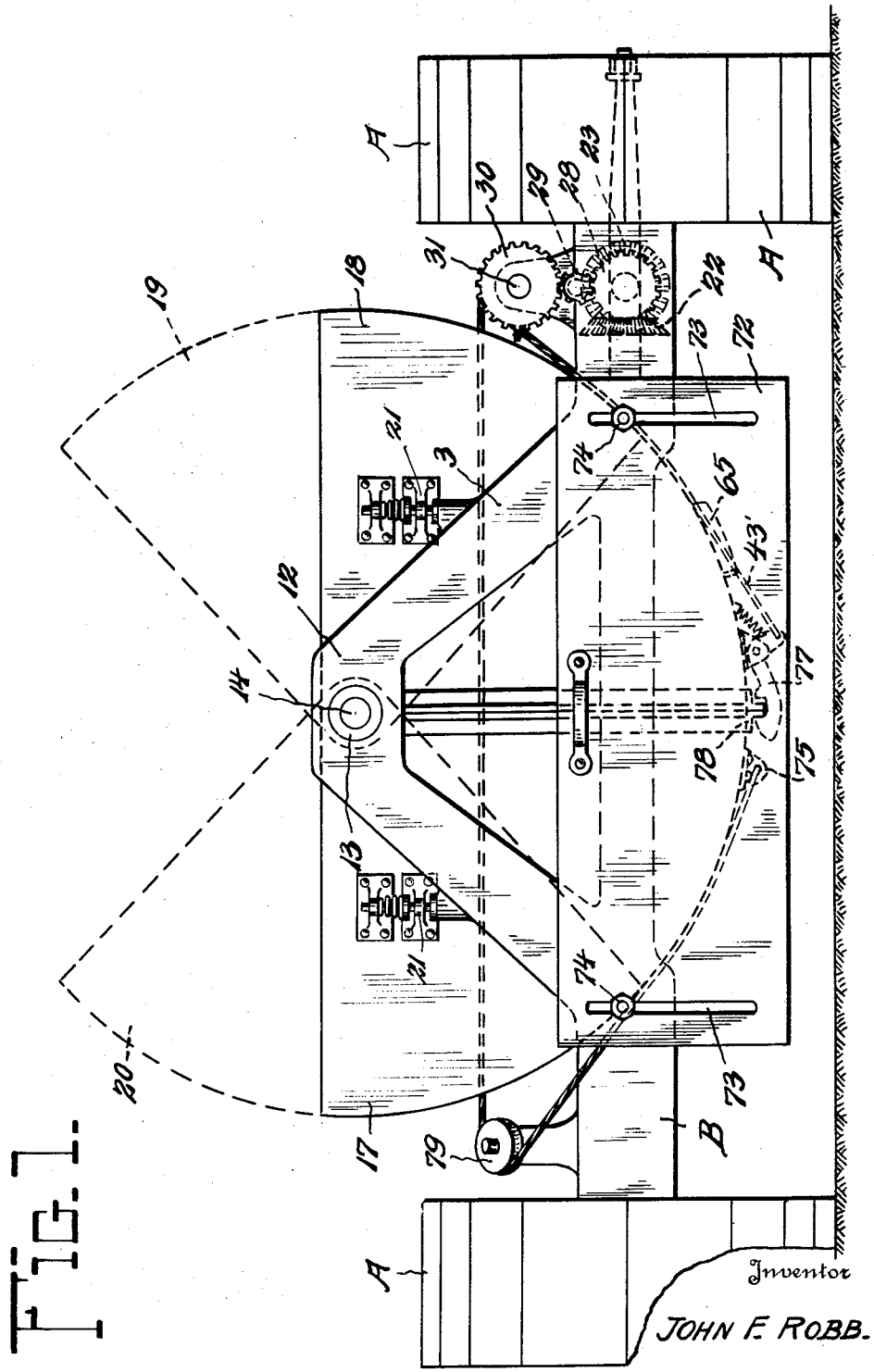

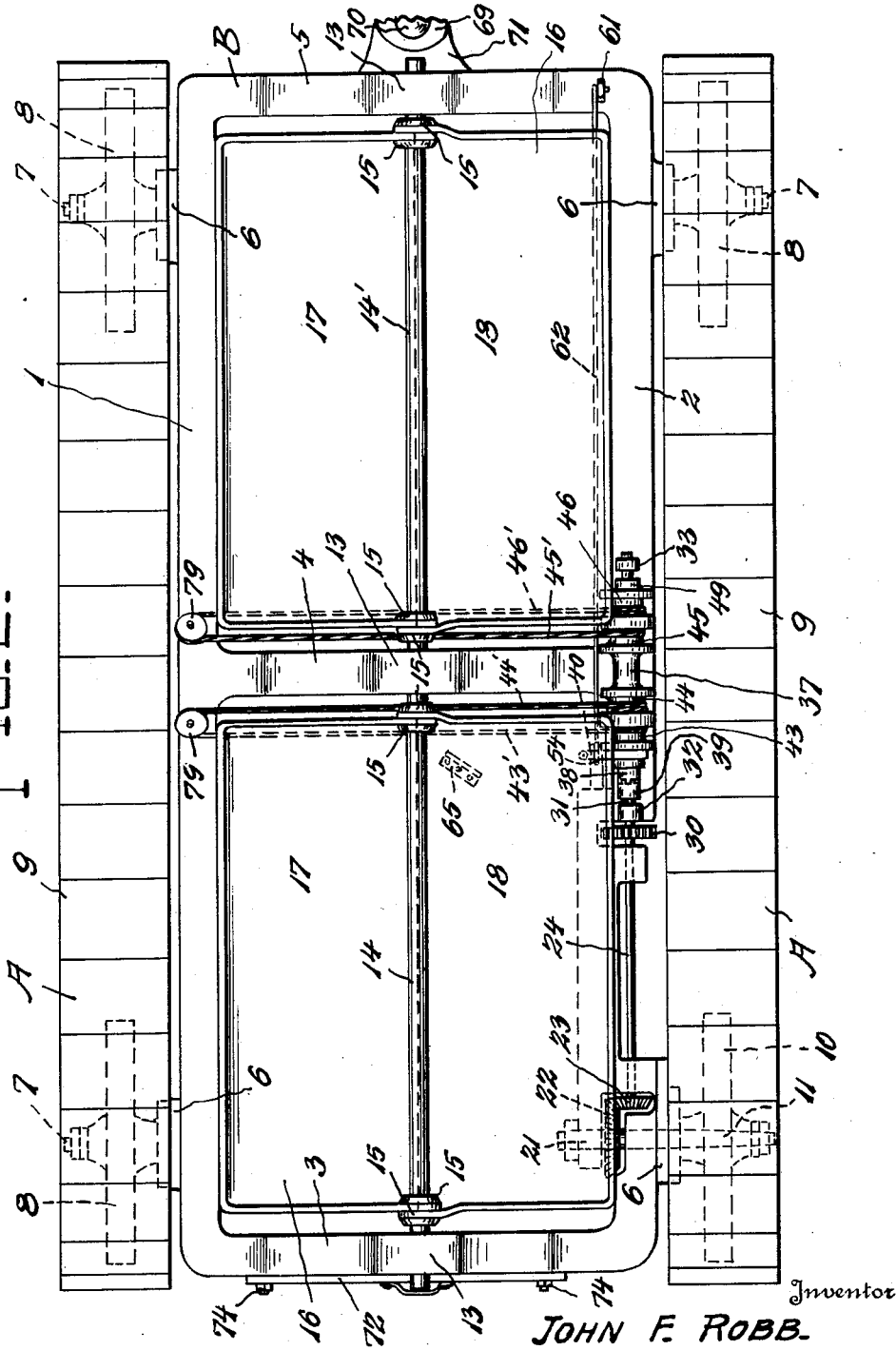

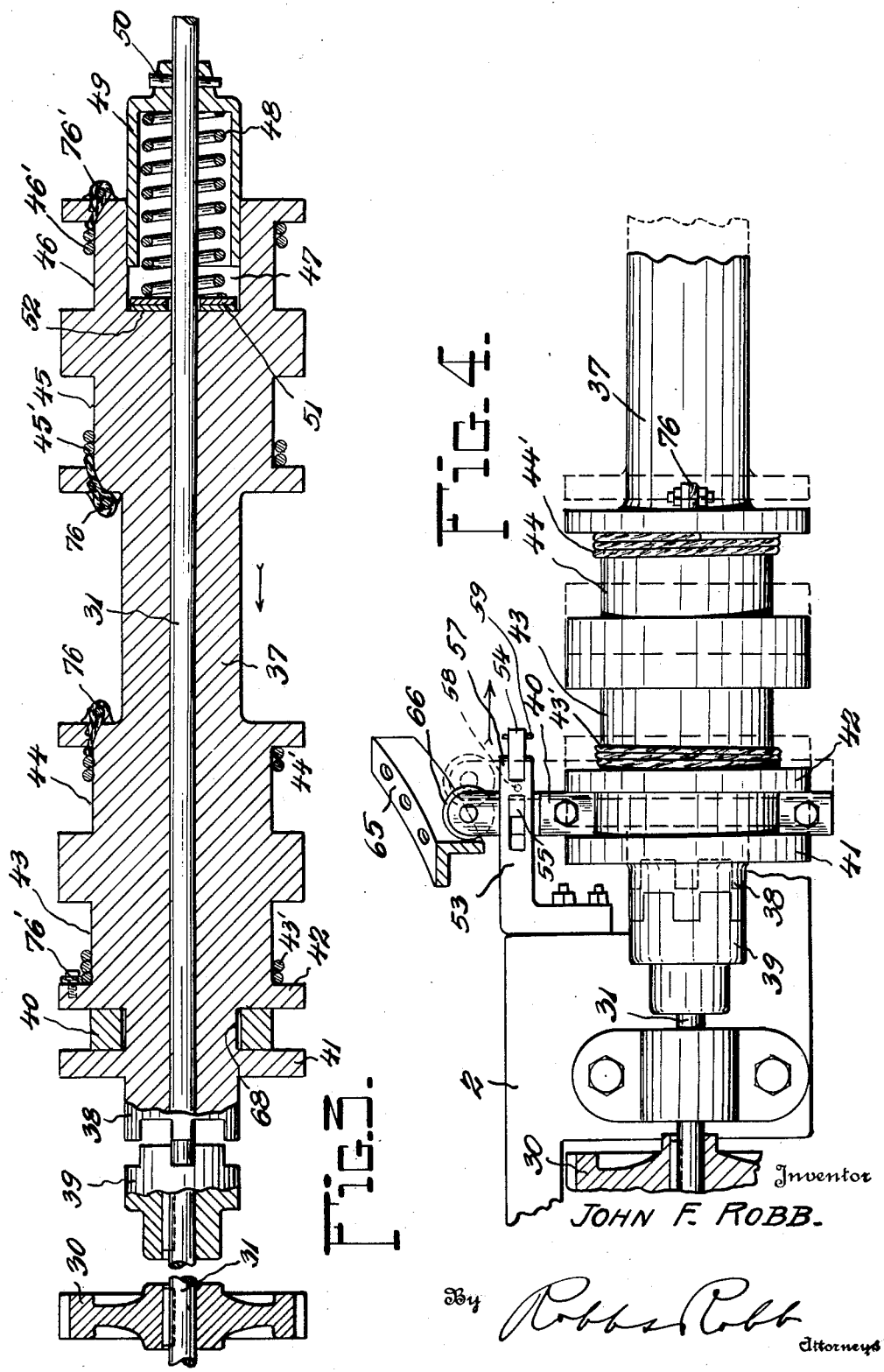

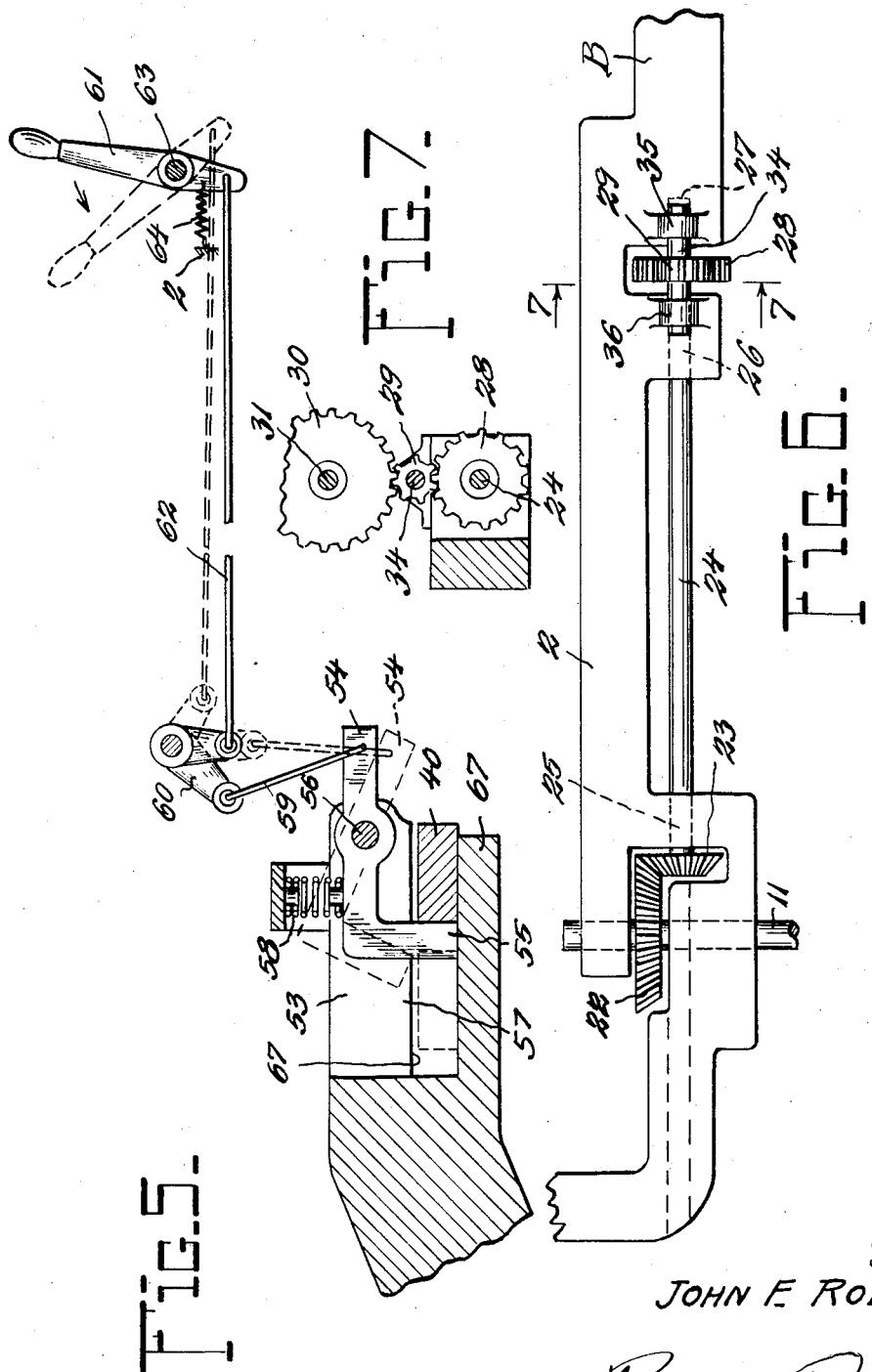

1,934,886

UNITED STATES PATENT OFFICE 1,934,886

DIRT HAULING WAGON

John F. Robb, Cleveland Heights, Ohio, assignor to National Equipment Corporation, Milwaukee, Wis., a corporation of Wisconsin Application November 14, 1930
Serial No. 495,769

13 Claims. (Cl. 298—25)

The present invention relates to a dirt carrying vehicle, and more particularly to a type of such vehicle of relatively large dirt carrying capacity, although it will be understood that the invention is not to be limited to any certain size.

Vehicles or wagons of this general type are widely employed in the construction of roads, levees, and the like, where a considerable amount of material is to be transported from one place to another.

These so called dirt carrying wagons are drawn by means of connecting them to a tractor, or other self propelled vehicle, and thus moved along the way upon which the contents of the wagon are to be discharged. They are loaded quickly, usually, by large excavators such as clam-shell cranes, or dipper shovels.

The wagon of my invention is supported by mounting its frame or chassis upon endless traction devices, there being provided one or more dirt carrying compartments of clam-shell like types, or other suitable construction carried by the frame. I do not limit myself to the clam-shell form of these compartments.

The invention also involves novel discharge means for the said compartments, the same being selectively operative at the will of the operator through means driven by the endless traction devices as the wagon moves over the way upon which contents of the wagon are to be distributed.

The invention further includes means for automatically closing the dirt carrying compartments after the contents thereof have been discharged, and the positioning of the discharge compartments relatively close to the ground to reduce as much as possible the distance that the material discharged drops during the discharge operation.

The invention embraces also novel leveling means carried by the wagon for distributing and leveling the discharged materials as the wagon passes thereover; also other various detail features of construction and operation that are set forth later herein.

Figure 1 is an end view looking from the rear end of the wagon embodying my invention.

Figure 2 is a top plan view.

Figure 3 is a sectional view of the discharge mechanism.

Figure 4 is a fragmentary top view of the discharge mechanism illustrating the function of the clutch and associated parts thereof.

Figure 5 is a view in elevation of the clutch locking device, and its control means, some parts being shown in section.

Figure 6 illustrates a partial plan view of the frame and the mounting of the driving mechanism for the discharge mechanism therein.

Figure 7 is a sectional view taken on the line 7—7 of Figure 6.

Figure 8:
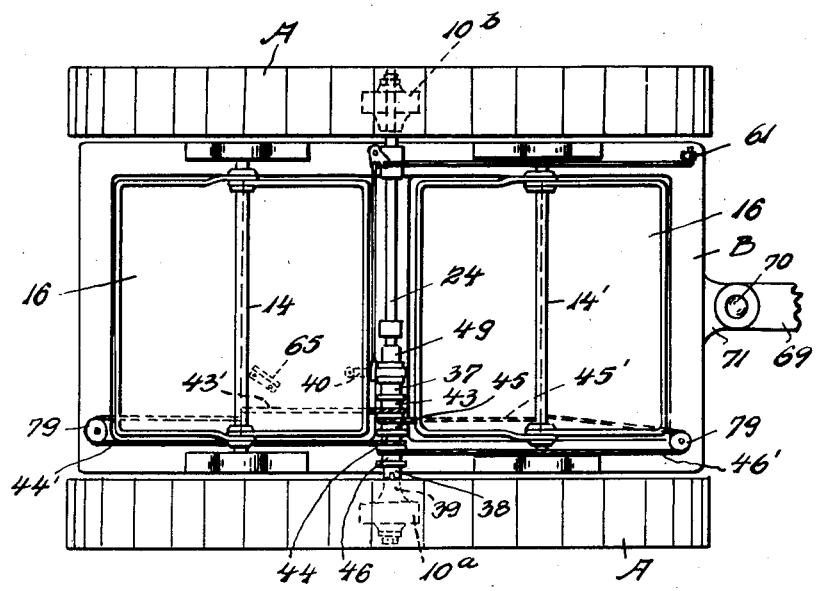
Figure 8 is a top view of the wagon showing the dirt compartment in transverse arrangement.

Referring to the drawings, which illustrate the preferred form of my invention, A designates endless traction devices upon which a frame B is mounted. The frame B consists of two side portions 1 and 2, connected by end cross bars or portions 3 and 5, and a similar intermediate member 4.

The portions 1 and 2 have extensions 6 on which the stub shafts 7 are mounted. Rotatably mounted on these shafts 7 are idler tumblers 8 engaging the traction shoes 9. One of the tumblers, as indicated at 10, is a driving tumbler and therefore fixed to a stub shaft 11, which is rotatable, so that rotation of the tumbler 10 will cause rotation of the shaft 11 and its beveled gear 22 keyed on said shaft and provided to drive the discharge mechanism as described later herein.

The cross portions 3, 4, and 5 of the frame project upwardly, and form upper portions 12, having bearings 13 thereon, adapted to receive shafts 14 and 14' on which there are hinged at 15 the sections of compartments 16 for the reception of the material to be carried by this wagon. The compartments 16 may be of clam-shell like sections or structure, comprising the like segment portions 17 and 18, or they may be of other suitable construction and shape enabling them to perform the functions as described herein. The compartments are hinged at 15, as before mentioned, and may be swung upwardly to a position indicated in Figure 1 in dotted lines, at 19 and 20, for discharge action.

The portion 2 of the frame differs from frame portion 1 in so far as it is constructed so as to provide bearings and housings for a gearing system and shafts which are provided to transfer rotation from the sprocket or tumbler wheel 10 by means of a shaft 11 to a beveled gear 22 fixed on said shaft. The beveled gear 22 is in engagement with another beveled gear 23 fixed to the shaft 24.

The shaft 24 is mounted in the frame portion 2 at 25, 26 and 27. Upon the shaft 24 there is also secured a spur gear 28, the said gear 28 being in engagement with an idler gear 29, and said idler gear transferring rotation to a spur gear 30 mounted on a shaft 31 carried by bearings 32 and 33. The idler gear 29 is mounted loosely for free rotation on a shaft 34 and said shaft is mounted in bearings 35 and 36. A discharge control device or mechanism 37 is carried for free rotation on shaft 31. Said discharging mechanism 37 comprises a clutch member 38 which can be brought into and out of engagement with a clutch member 39 fixed to the shaft 31. A clutch actuating lever or member 40 is provided as a part of the discharge mechanism 37 for permitting engagement and disengagement of the clutch devices 38 and 39. Said actuating member 40 is mounted between guide flanges 41 and 42, and thereby holds the clutch members normally out of engagement with each other, through releasable locking instrumentalities later to be described which instrumentalities permit, upon release thereof, a return of the clutch actuating member 40 in the opposite direction, to permit engagement of the clutch members 38 and 39, and also included in the discharge mechanism. Cable hoist drums 43, 44, 45 and 46 are provided and are rotative on the shaft 31, cables 43', 44', 45' and 46', being wound upon the respective drums.

Opposite to the end having the clutch member 38 the discharge control device 37 has a bore 47 for the reception of a clutch actuating spring 48 located in a housing 49, said housing being fixed to shaft 31 by means of a pin 50. The member 37 slides over the housing 49 so as to enclose the spring 48 in all positions which the member 37 may take. A friction brake 51 is provided engaging the inner surface 52 of the bore, and at all times held in engagement with said surface by the pressure of the spring 48, for retarding closing movement of the dirt compartment sections.

Referring now to Figures 4 and 5, there is provided locking means 53 located above the member 40, and comprising a latch 54 having a nose 55, said latch being mounted on a shaft 56 in the housing 57. A spring 58 tends to hold the latch or locking lever 54 in engagement with the clutch actuating member 40, to maintain the latter inoperative for clutch engagement. A rod 59 connected to the latch 54 and to a crank 60 is provided to transfer movement of a manually controlled lever 61 by means of rod 62 to said latch 54. The manually controlled lever 61 is mounted on a shaft 63 and provided with a return spring 64, the other end of which is connected to the frame portion 2.

An abutment cam or member 65 mounted on one of the compartment segments or sections 18 is provided to engage the clutch actuating member 40, and the clutch actuating member 40 is provided with a roller 66 for engagement with the abutment member 65 and reducing the friction between these parts.

On the housing 57 there are provided guiding parts 67 on which the clutch actuating member 40 slides. These guiding parts 67 are for the purpose of preventing the clutch actuating member 40 from rotating with the discharge mechanism 37, and it is obvious from Figure 3 that said member 40 surrounds the member 37 as indicated at 68, and the member 37 may rotate freely therein.

A draw bar 69 pivotally mounted at 70 on an extension 71 of the frame member 5 is provided to be connected to a tractor for pulling the wagon.

A leveling blade 72 provided with slots 73 is connected to the rear end of the machine by means of screws 74. This leveling blade may be adjusted to different heights above the ground to allow a spreading and leveling of the discharged contents of the compartments to a layer of a desired thickness.

The cables 44' and 45' have one end connected to the hoist drums 44 and 45 of the discharge device 37, as indicated at 76. They are guided over rollers or sheaves 79 to securing members 75 fastened to the lower portion of the compartment sections 17 and are connected to said securing members at their other ends. One of the ends of each cable 43' and 46' is connected to locking members 77 locking the compartment sections 16, together when they are closed, by engagement of said lock member 77 with an angle member 78 connected to the segments 17. The other end of the cables 43' and 46' are fastened to their respective hoist drums 43 and 46 of the discharge device 37 by means of screws 76'.

It is obvious from Figure 1 that the special construction of the frame B makes it possible to have the compartments 16 mounted as low as desirable to give the machine sturdiness and to reduce the height of the free fall of the material discharged therefrom so that hard materials, for instance stones, may be unloaded on soft surfaces without danger of destroying the same.

The compartments may be transverse instead of longitudinal to the frame. Obviously, there may be provided on segments 17 and 18, any suitable type of shock absorber indicated at 21 on Figure 1, to lessen the shock of the closing of the segments.

*Operation*

Assuming the clutch actuating lever 40 is in the full line position as shown in Figure 5, the clutch members 38, 39 will then be out of engagement. The compartments 17 and 18 are closed and have been filled with dirt or other materials and the wagon is on its way to the place where the contents thereof, shall be discharged.

When the place for dumping is reached, the manual control lever 61 in front of the wagon is moved to dotted line position in Figure 5. This will cause the crank 60 to swing downwardly to the dotted line position, and the rod 59 will turn the latch 54 in the position indicated in dotted lines of Figure 5, thus releasing the clutch actuating lever 40 which will permit the discharge member 37 to move under the influence of spring 48 in the direction as indicated by an arrow in Figure 3.

The clutch member 38 will engage the clutch member 39 fixed to the rotating shaft 31 and thus will cause rotation of the member 37. The cables 43', 44', 45' and 46' are wound upon their respective drums 43, 44, 45 and 46. The locking members 77 for the compartment sections are unlocked at the same time, and the segments 17 and 18 are swung into position indicated in dotted lines at 19 and 20 in Figure 1. The contents of the compartments are discharged immediately upon the ground over which the wagon travels. When the compartments 17 and 18 have opened so far that the abutment member 65 carried by the segment 18, strikes against the roller 66, as clearly shown in Figure 4, the clutch actuating member 40 and discharge mechanism 37 are moved in the direction indicated by the arrow in Figure 4, until the dotted line position is reached. The clutch members 38 and 39 are thereby brought out of engagement while the discharge mechanism 37 slides along the shaft 31. Because the discharge assembly 37 is mounted freely rotatable on the shaft 31, the weight of the segments will force the same downwardly and unwind the cables from their respective drums. The lock 77 will engage the angle member 78 and hold the compartments closed so that no accidental discharging of the compartments is possible. The brake 52 will retard the too quick closing action of the compartments and will prevent possibility of further unwinding of the cables after the compartments have closed. As mentioned before, the clutch actuating member 40 will have now the position shown in dotted lines in Figure 4, and in full lines in Figure 5, and the latch 54 will next be forced downwardly by the spring 58. Crank 60 and the lever 61 will return to their previous full line positions, by action of springs 58 and 64, and the clutch actuating member 40 will be held by means of the interlocking portion 55 in this position, until the machine is discharged again.

While the contents of the dirt compartments are discharged as mentioned before, the machine is still traveling over the ground, and the materials falling out of its containers 16 are leveled and distributed evenly over the ground by the action of the leveling blade 72, which is set previously to the desired height above the ground. The blade 72 may not be used under some conditions, however.

From the previous description, it will be obvious that the closing action of the compartments, and the returning of the discharge mechanism to non-discharging position, are fully automatic and that after the material has been discharged, the wagon is ready to be loaded again without manipulation of its discharge control devices.

As described herein the wagon may travel on endless traction devices and it may be mentioned that in place of the traction devices as shown in Figure 1 and Figure 2 there may be used endless rocker traction devices.

Figure 9:
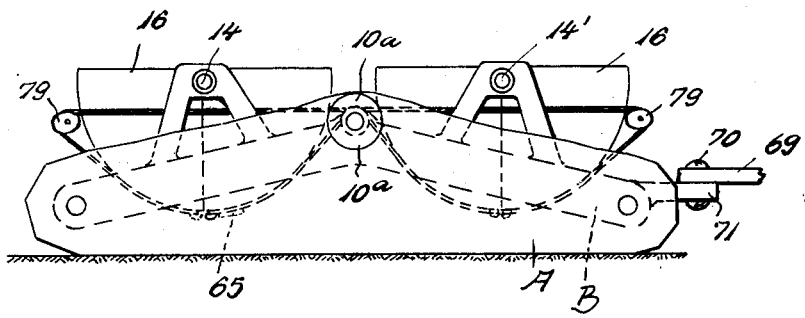
Figure 9 is a side elevation of Figure 8 in a somewhat diagrammatic showing.

In Figure 8 and Figure 9 there is shown an arrangement of the dirt compartments 16 wherein the compartments are placed transversely of the longitudinal axis of the machine and mounted on rocker traction devices wherein the shaft 24 which carries the discharge control device 37 is directly driven by a tumbler wheel 10a, the tumbler wheel 10b being mounted freely rotative on the shaft 24. The construction of the discharge control device 37 is practically the same as disclosed in Figure 2 and Figure 3 with the exception that the cable drums 43, 44, 45 and 46 are brought closer together and the clutch actuating member 40 has been placed near the clutch actuating spring housing 49.

While I have illustrated and described a practical embodiment of my invention, it will be understood that changes may be made in the details of construction and arrangements of parts set forth, within the scope of the appended claims, without departing from the spirit of my invention.

Having thus described my invention, what I claim as new and desire to secure by Letters Patent of the United States, is:—

1. A dirt wagon of the class described, comprising the combination with a supporting frame, traction devices for carrying the frame, and a compartment adapted to receive material to be discharged, supported by the frame, of means carried by the frame and longitudinally disposed with respect to the wagon driven by the traction devices, the said means being adapted to operate the compartment for discharging material upon a desired surface, manual means for initiating the opening and automatic closing of the compartment, and automatic locking means to prevent accidental discharge.

2. A dirt wagon of the class described, comprising, in combination, a supporting frame of low structure, traction devices for carrying the frame, a material compartment comprising sections supported by upwardly extending portions of the frame permitting a relatively low mounting of the compartments above the ground, and means driven by the traction devices for lifting the sections for discharging material from the compartments upon a desired surface, lock means normally to hold the sections closed, and instrumentalities to initially unlock the sections and then initiating the traction driven means that lifts and opens the sections for discharging.

3. A dirt wagon of the class described, comprising, in combination, a supporting frame, traction devices for carrying the frame, a material compartment supported by the frame consisting of a plurality of segments adapted to receive material to be discharged, of discharge mechanism comprising a cable hoist drum and cables connected thereto and to said compartment segments, clutching means and clutch actuating devices, comprising a resilient means for causing engagement of the clutching means to perform discharging of the compartment, a clutch actuating member on the discharge mechanism, and an abutment member on one of the segments of the compartments adapted to abut against the actuating member to cause disengagement of the clutching means and close the compartment after its contents have been discharged upon a desired surface.

4. A dirt wagon of the class described, comprising, in combination, a supporting frame, a material compartment mounted on said frame, traction devices for carrying said frame, shafts on said frame adapted to carry said traction devices, one of said shafts being rotatively mounted on the frame and fixed to the traction devices to form a driving element, and discharge means driven by such driving element to cause opening and closing action of the compartment, and means longitudinally disposed with respect to the wagon to control said operation.

5. A dirt wagon of the class described, comprising, in combination, a supporting frame, a material compartment comprising segments mounted on said frame, traction devices for carrying said frame, shafts on said frame adapted to carry traction devices, one of said shafts being rotatively mounted on the frame and fixed to one of the traction devices to form a continuously rotating driving element, and discharge actuating means connected with said driving element to perform opening and disconnected therewith to perform immediate closing action of the segments of the compartments, independent means to control the opening and closing action of the segments, and locking means to lock the segments in closed position to prevent accidental opening of the same.

6. In a dumping dirt hauling wagon of the class set forth, in combination, a frame, traction devices supporting said frame, a dumping compartment comprising complemental sections adapted to separate to effect dumping of a load in the compartment, operating means longitudinally disposed to the said sections the traction devices being adapted to cause dumping action of said sections, and means to automatically restore the sections to closing position after dumping.

7. In a dumping dirt hauling wagon of the class set forth, in combination, a frame, traction devices supporting said frame, a dumping compartment comprising complemental sections adapted to separate to effect dumping of a load in the compartment, operating means longitudinally disposed to the said sections the traction devices being also adapted to cause dumping action of said sections, means to automatically restore the sections to closing position after dumping, and means to retard the closing movement of the sections.

8. In a dumping dirt hauling wagon of the class set forth, in combination, a frame, traction devices supporting said frame, a dumping compartment comprising complemental sections adapted to separate to effect dumping of a load in the compartment, operating means longitudinally disposed to the said sections and traction devices being also adapted to cause dumping action of said sections, means to automatically restore the sections to closing position after dumping, the last mentioned means including a trip device to permit gravitative closing movement of the sections, and an instrumentality for retarding said gravitative movement.

9. In a dumping dirt hauling wagon of the class set forth, in combination, a frame, traction devices supporting same, a dumping compartment including separable sections adapted to separate to dump the contents of the compartment, automatic means for causing the compartment sections to separate and then gravitatingly return to their normal closed positions, manual means to release the automatic means aforesaid, and brake means for retarding the movement of said sections as they close together after dumping and during their gravitating movement.

10. In a dumping dirt hauling wagon of the class set forth, in combination, a frame, traction devices supporting same, a dumping compartment including separable sections adapted to separate to dump the contents of the compartment, automatic means for causing the compartment sections to separate and then gravitatingly return to their normal closed positions, manual means to release the automatic means aforesaid, and lock means for normally locking the sections together initially operable by the automatic means preliminary to the separation of the sections by said automatic means.

11. In a dumping wagon of the class set forth, a frame, traction supporting means therefor, a dumping compartment comprising separable sections, the separating movement of which will dump the contents of the compartment together when in material receiving position, and means to cause separating movement of the sections of the compartment connected with the lock device to initially incapacitate the latter and thereafter cause separation of the compartment sections for dumping, said lock device consisting of a lock member engageable with adjacent portions of the sections and tiltable into and out of such engagement.

12. In a receiving wagon of the class set forth, in combination, a plurality of dumping compartments, each compartment consisting of complemental separable sections, traction devices, a frame carrying the compartments and supported by the traction devices, a driving mechanism normally driven by one of the traction devices, an operating mechanism common to both of the compartments for actuation of a section of each compartment to cause dumping action thereof, and means manually to control connection of the operating mechanism with the driving mechanism aforesaid.

13. In a receiving wagon of the class set forth, in combination, a plurality of dumping compartments, each compartment consisting of complemental separable sections, traction devices, a frame carrying the compartments and supported by the traction devices, a driving mechanism normally driven by one of the traction devices for actuation of a section of each compartment to cause dumping action thereof, means manually to control connection of the operating mechanism with the driving mechanism aforesaid.

JOHN F. ROBB.